(12) United States Patent
Ahmed et al.

(10) Patent No.: US 11,748,888 B2
(45) Date of Patent: Sep. 5, 2023

(54) END-TO-END MERGE FOR VIDEO OBJECT SEGMENTATION (VOS)

(71) Applicant: L'Oreal, Paris (FR)

(72) Inventors: Abdalla Ahmed, Toronto (CA); Irina Kezele, Toronto (CA); Parham Aarabi, Richmond Hill (CA); Brendan Duke, Toronto (CA)

(73) Assignee: L'Oreal, Paris (FR)

( * ) Notice: Subject to any disclaimer, the term of this patent is extended or adjusted under 35 U.S.C. 154(b) by 401 days.

(21) Appl. No.: 17/096,778

(22) Filed: Nov. 12, 2020

(65) Prior Publication Data

US 2021/0150728 A1 May 20, 2021

Related U.S. Application Data

(60) Provisional application No. 62/935,851, filed on Nov. 15, 2019.

(51) Int. Cl.
*G06T 7/11* (2017.01)
*G06T 7/174* (2017.01)
(Continued)

(52) U.S. Cl.
CPC .............. *G06T 7/11* (2017.01); *G06N 3/08* (2013.01); *G06T 7/174* (2017.01); *G06T 7/20* (2013.01);
(Continued)

(58) Field of Classification Search
CPC ... G06T 7/11; G06T 7/174; G06T 7/20; G06T 9/002; G06T 2207/10016;
(Continued)

(56) References Cited

U.S. PATENT DOCUMENTS 10,713,794 B1 * 7/2020 He ..................... G06N 3/084
10,803,604 B1 * 10/2020 Gui ..................... G06V 20/49
(Continued)

OTHER PUBLICATIONS

Lu, X., et al., "See More, Know More: Unsupervised Video Object Segmentation with Co-Attention Siamese Networks", 2019 IEEE/CVF Conference on Computer Vision and Pattern Recognition (CVPR), pp. 3618-3627, Jun. 2019.*

*Primary Examiner* — Xuemei G Chen
(74) *Attorney, Agent, or Firm* — Oblon, McClelland, Maier & Neustadt, L.L.P.

(57) ABSTRACT

There are provided methods and computing devices using semi-supervised learning to perform end-to-end video object segmentation, tracking respective object(s) from a single-frame annotation of a reference frame through a video sequence of frames. A known deep learning model may be used to annotate the reference frame to provide ground truth locations and masks for each respective object. A current frame is processed to determine current frame object locations, defining object scoremaps as a normalized cross-correlation between encoded object features of the current frame and encoded object features of a previous frame. Scoremaps for each of more than one previous frame may be defined. An Intersection over Union (IoU) function, responsive to the scoremaps, ranks candidate object proposals defined from the reference frame annotation to associate the respective objects to respective locations in the current frame. Pixel-wise overlap may be removed using a merge function responsive to the scoremaps.

12 Claims, 8 Drawing Sheets

(51) Int. Cl.
*G06T 7/20* (2017.01)
*G06T 9/00* (2006.01)
*G06N 3/08* (2023.01)
*G06V 20/40* (2022.01)
*G06V 40/12* (2022.01)
*G06V 10/771* (2022.01)
*G06V 10/82* (2022.01)
*G06V 10/26* (2022.01)
*G06V 40/10* (2022.01)
*G06V 10/62* (2022.01)

(52) U.S. Cl.
CPC ............ *G06T 9/002* (2013.01); *G06V 10/273* (2022.01); *G06V 10/771* (2022.01); *G06V 10/82* (2022.01); *G06V 20/40* (2022.01); *G06V 40/107* (2022.01); *G06V 40/12* (2022.01); *G06T 2207/10016* (2013.01); *G06T 2207/20081* (2013.01); *G06T 2207/20084* (2013.01); *G06T 2207/20132* (2013.01); *G06V 10/62* (2022.01)

(58) Field of Classification Search
CPC . G06T 2207/20081; G06T 2207/20084; G06T 2207/20132; G06T 7/215; G06T 7/277; G06T 2207/30196; G06T 7/246; G06N 3/08; G06N 3/045; G06V 10/273; G06V 10/771; G06V 10/82; G06V 20/40; G06V 40/107; G06V 40/12; G06V 10/62; G06F 18/2113

See application file for complete search history.

(56) References Cited

U.S. PATENT DOCUMENTS

| | | | | |
|---|---|---|---|---|
| 11,068,713 | B1* | 7/2021 | Li | G06V 20/17 |
| 11,481,751 | B1* | 10/2022 | Chaubard | G06V 10/82 |
| 2012/0027272 | A1* | 2/2012 | Akinyemi | G06T 7/11 |
| | | | | 382/128 |
| 2015/0235377 | A1* | 8/2015 | Wang | G06F 16/71 |
| | | | | 382/103 |
| 2019/0228266 | A1* | 7/2019 | Habibian | G06N 3/044 |
| 2019/0311202 | A1* | 10/2019 | Lee | G06T 9/002 |
| 2020/0026928 | A1* | 1/2020 | Rhodes | G06T 7/194 |
| 2020/0074642 | A1* | 3/2020 | Wilson | G06T 7/174 |
| 2020/0117906 | A1* | 4/2020 | Lee | G06V 10/764 |
| 2020/0160065 | A1* | 5/2020 | Weinzaepfel | G06N 3/045 |
| 2020/0193609 | A1* | 6/2020 | Dharur | G06T 7/143 |
| 2020/0327304 | A1* | 10/2020 | Li | G06V 40/19 |
| 2020/0380702 | A1* | 12/2020 | He | G06T 7/70 |
| 2021/0019908 | A1* | 1/2021 | Zhang | G06V 20/176 |
| 2021/0117683 | A1* | 4/2021 | Chua | H04N 19/176 |
| 2021/0133461 | A1* | 5/2021 | Ren | G06T 7/11 |

* cited by examiner

END-TO-END MERGE FOR VIDEO OBJECT SEGMENTATION (VOS)

CROSS-REFERENCE

This application claims the domestic benefit of U.S. Provisional Application No. 62/935,851 filed Nov. 15, 2019, the contents of which are incorporated herein by reference where permissible.

FIELD

This disclosure relates to image processing using neural networks and more particularly to video object segmentation (VOS), tracking and segmenting one or more objects through a video clip.

BACKGROUND

Object segmentation generally relates to processing an image (e.g. a static image) to determine the presence and location of one or more salient (e.g. common, every day) objects, outputting a mask or other construct identifying the pixels in the image where each object is located. Video object segmentation is similar, however a video is a sequence of frames over a period of time where each frame defines an image and where the object's location in different frames may be different. For example, a video may commence with an initial frame and progress to a subsequent frames in an ordered sequence. A video clip may be a whole video or a portion of one, commencing from an initial frame—e.g. a reference frame—to subsequent frames until the end of the clip. Objects that appear in the reference frame may move locations from one frame to another, for example, because the object is in motion relative to the camera, the camera is in motion relative to the object or both the camera and object are moving. Tracking and segmenting an object through a video clip is desirable for a number of reasons. For example, it may be desired to apply an effect to an object in each frame and provide the output as an augmented reality, virtual reality or mixed reality experience. Tracking and segmenting objects may have other purposes, too.

Tracking and segmenting objects through a video is challenging to computing devices. Image processing techniques to identify and segment objects in a single static image are well-known using various network models trained using supervised learning techniques. However, tracking an object from one image to the next image in a video poses problems. The known networks are not trained for such tasks. One issue is that appropriate training data for supervised learning is not widely available. Associating an object detected in a first image with the same object as detected in a second image of a video thereby to track the object is problematic.

SUMMARY

There is proposed a method for semi-supervised video object segmentation, which involves tracking and segmenting one or more objects throughout a video clip, conditioned on one single-frame reference annotation for each object track in the sequence of frames of the video clip. The approach takes advantage of the prior knowledge about the appearance and shape of salient objects from image level datasets like COCO, while also using VOS datasets like YouTube-VOS to learn end-to-end merging of per-frame predictions (YouTube is a trademark of GOOGLE LLC).

These and other aspects will be understood to a person of skill in the art and such a person will also understand that, though the aspects may be summarized or described separately for convenience, they may be combined and/or used together.

There are provided methods and computing devices using semi-supervised learning to perform end-to-end video object segmentation, tracking respective object(s) from a single-frame annotation of a reference frame through a video sequence of frames. A known deep learning model may be used to annotate the reference frame to provide ground truth locations and masks for each respective object. A current frame is processed to determine current frame object locations, defining object scoremaps (also referenced as attention maps herein) as a normalized cross-correlation between encoded object features of the current frame and encoded object features of a previous frame. Scoremaps for each of more than one previous frame may be defined. An Intersection over Union (IoU) function, responsive to the scoremaps, ranks candidate object proposals defined from the reference frame annotation to associate the respective objects to respective locations in the current frame. Pixel-wise overlap may be removed using a merge function responsive to the scoremaps. The scoremaps and ranking function find a probability or normalized score distribution representing respective objects' likeliness to belong to respective locations in the current frame.

In an embodiment there is provided a method of semi-supervised video object segmentation to track and segment one or more objects throughout a video clip comprising a sequence of frames including a previous frame and a current frame, the previous frame defining a target and the current frame a source. The method comprises: encoding features for each respective object in the source; defining an attention map between the features encoded from the source and features of the respective object encoded from the target; associating the respective objects to respective locations in the current frame using an Intersection over Union (IoU) function responsive to the attention map to rank candidate object proposals for the respective locations, where each candidate object proposal is tracked from a single-frame reference annotation of a reference frame of the video clip providing ground truth locations of the respective objects in the reference frame; and defining a video segmentation mask for the respective object in the current frame in accordance with the associating.

In an example, there is provided a method of semi-supervised video object segmentation to track and segment one or more objects throughout a video clip comprising a sequence of frames including respective previous frames and a current frame, each of the respective previous frames defining a respective target and the current frame a source, the method comprising: for each respective object: encoding features of the respective object in the source; and for each of the respective targets, defining respective attention maps between the features encoded from the source and features of the respective object encoded from the respective target. The respective objects are associated to respective locations in the current frame using an Intersection over Union (IoU) function responsive to the respective attention maps to rank candidate object proposals for the respective locations, where each candidate object proposal is tracked from a single-frame reference annotation of a reference frame of the video clip providing ground truth locations of the respective objects in the reference frame; and a video segmentation mask is defined for the respective object in the current frame in accordance with the associating.

In an example, there is provided a method comprising: training each of an encoder model and a localizer model using semi-supervised learning to track and segment one or more respective objects in a video clip comprising a plurality of frames in a sequence, the training conditioned on one single-frame reference annotation of a reference frame for each respective object in the video clip. In an example: the encoder model comprises a neural network model configured to encode object features; the encoder model is used during training to encode object features in the reference frame, a current frame and a previous frame to produce respective object features from each of the frames; and the localizer model is used during training to localize objects and to enforce that the encoder model learns discriminative object features to enable tracking of the respective objects from the reference frame to the current frame via the previous frame.

Computing device and computer program product aspects are also provided.

DESCRIPTION

In an embodiment, a first component of the approach involves learning discriminative features for tracking motion of individual pixels in videos by learning their frame-to-frame correspondences, and this knowledge can be used in downstream augmented reality (AR) tasks. For example, correspondences can be used to track the motion of a 2D or 3D fingernail model in order to stabilize rendering of textures and lighting in the virtual fingernail polish try-on application shown in FIG. 1.

Figure 1:
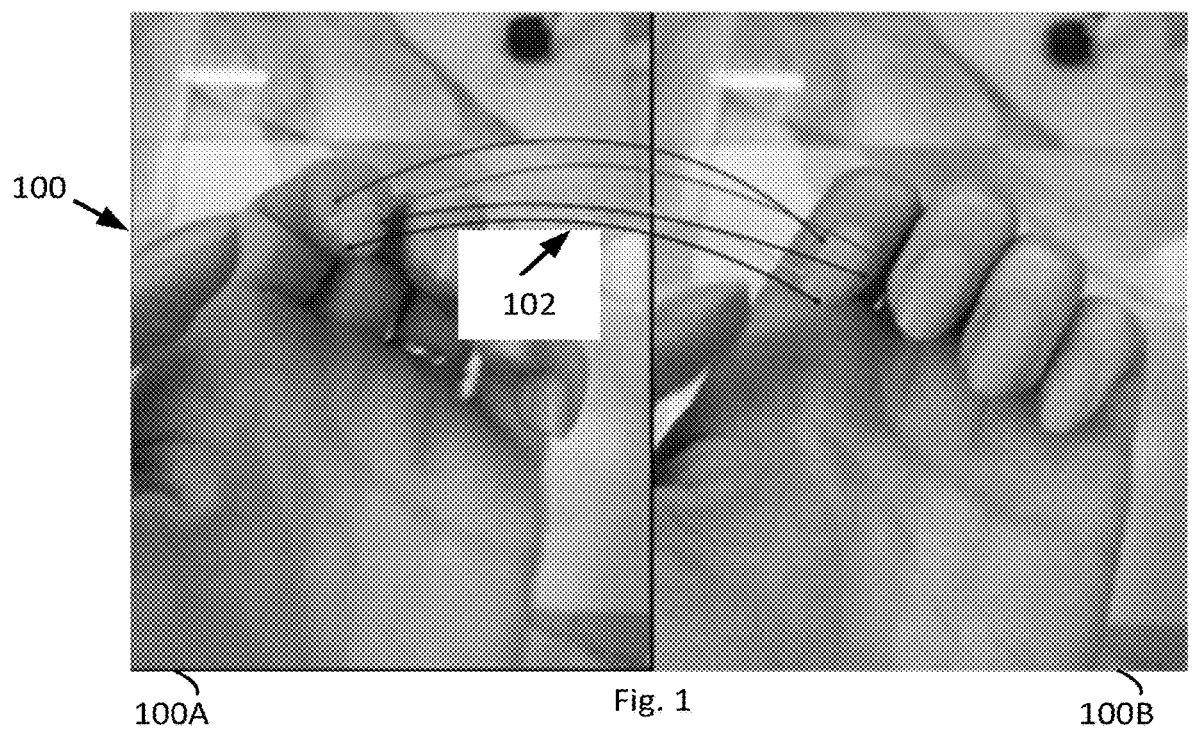
FIG. 1 shows a pair of images (frames of a video) from a virtual try on application with annotations.

FIG. 1 shows a pair of images 100 (individually 100A, 100B) from a virtual try on application with annotations (e.g. 102) showing correspondences, in accordance with an embodiment. The images 100 show an example of sparse correspondences (lines linking points) in consecutive frames 100A, 100B of a first-person fingernail polish try-on application. The correspondences 102 are shown sparsely for visualization, whereas the approach herein produces dense correspondences for every fingernail. The dense correspondences can be used downstream for stabilizing rendering in augmented reality applications such as the fingernail polish try-on shown here in FIG. 1. That is, in an embodiment, an augmented reality application is configured to track an object frame to frame, the object is annotated, for example, its color or other appearance characteristic is changed from a source image in each frame, responsive to the tracking of the object.

Other applications such as hair colour and make-up try-on, as well as clothing try-on, would also benefit from temporal smoothing of rendering made possible by the correspondences produced by the approaches herein. In these AR applications, correspondences are needed for temporally consistent tracking, and video object segmentation is needed to throw away outliers, e.g., to prevent rendering of nail polish outside the fingernail region of the video.

Furthermore, the final video object segmentation outputs of the systems and methods shown and described herein in accordance with examples can be used directly in tracking applications such as player tracking in sports analytics, person tracking in security footage, and car and road obstacle tracking in self-driving vehicle applications.

The disclosure herein demonstrates an approach to video object segmentation that uses prior knowledge learned from more easily obtainable static datasets. In accordance with examples and techniques herein, there is shown a manner to rank object proposals (e.g. an object proposal ranking function) that utilizes a "soft mIoU" (mean Intersection over Union) method to order object proposals given their cross-correlation scoremap with a reference object proposal. In accordance with examples and techniques herein, also there is shown a manner for mask-merging: assigning each pixel in an overlapping (object) region to its true object track in the case where multiple object tracks' bounding boxes overlap.

The approach herein distinguishes previous work in video object segmentation (VOS) and feature matching. In accordance with examples and techniques herein, there is produced a VOS architecture that unifies object proposal and mask refinement models by predicting frame-to-frame correspondence scoremaps.

Methods and Computing Devices/Systems

Training System Architecture

Figure 2:
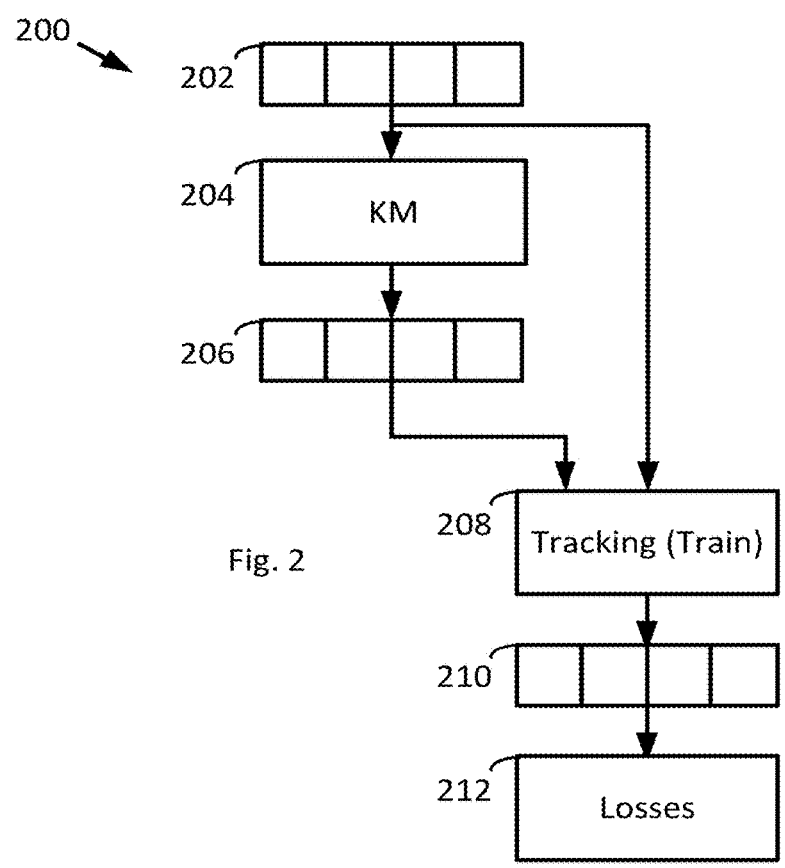
FIG. 2 is a block diagram showing a training system architecture in accordance with an embodiment.

FIG. 2 is a block diagram showing a data and processing flow of a training system architecture 200 (e.g. as implemented in a computing device) in accordance with an embodiment. System architectures, as proposed herein, differ at training and inference time, since during training time an encoder component (the "encoder") is trained to extract features that a localizer component (the "localizer") can use to localize objects. At training time, a coupling is used between localizer and encoder to enforce that the encoder learns discriminative features for tracking.

FIG. 2 shows the training system architecture 200, where a video clip 202 (e.g. a sequence of frames) is first processed by a Known Model (KM) 204, in order to extract bounding box and instance segmentation proposals for respective objects 206. While the video clip 202 is shown in FIG. 2 comprising 4 frames, this is merely an illustrative representation. Videos clips typically have more than 4 frames. Similarly, while the KM block 204 is shown outputting results for 4 respective objects, this too is merely an illustrative representation. More or fewer respective objects may be detected (for which respective bounding box and instance segmentation proposals are provided for each respective object as detected). As implemented, Mask R-CNN (Region-based Convolutional Neural Network) was used as the KM but other models for object detection may be employed.

The Known Model 204 may comprise a deep learning model conditioned using one or more image-level datasets using supervised learning to identify objects in an image and provide respective bounding boxes and segmentations (e.g. 206) for each of the objects identified. As further described the candidate proposals for objects in a current frame are defined from the respective bounding boxes generated for the reference frame or from bounding boxes of objects tracked from the reference frame.

The video clip (e.g. its frames) are also input to a tracking submodule 208 (shown and described in more detail with reference to the block diagram of FIG. 3), which at training time outputs a set $\{G(\theta_t)\}$ of sampling grids 212 that define a source-to-target warp predicted by a localizer component of 208 (see FIG. 3).

In the present example of the training system architecture, three losses are applied, namely a tracking loss, a similarity loss, and a dissimilarity loss, on the predicted sampling grids to train discriminative features for tracking.

Losses

In the following description of the system's loss functions, $\theta_{t-1}$ is the theta computed by the localizer using the previous frame, $\theta_0$ is the theta computed by the localizer using the reference frame, $\theta_t$ is the ground truth theta for the current frame, $G(\theta_t)$ corresponds to the sampling grid used to extract a patch from the image features using transformation parameters $\theta_t$, and $P(\theta_t)$ corresponds to the extracted image features using $\theta_t$.

Tracking:

The tracking loss is defined as, $$L_{tracking} = L_1(G(\theta_{t-1}), G(\theta_t)) + L_1(G(\theta_0), G(\theta_t)) \quad (1)$$

where $L_1$ is a smooth $L_1$ loss.

Similarity:

The predicted patch and the ground truth patch should be similar in feature space, which is enforced by introducing a similarity loss as follows.

$$L_{similarity} = -\langle P(\Theta_{t-1}), P(\Theta_t) \rangle - \langle P(\Theta_0), P(\Theta_t) \rangle \quad (2)$$

Dissimilarity:

Introduced is a dissimilarity loss to distinguish between the target object track and other object tracks and to also distinguish between the target object track and background. It also pushes the encoder to not just output the same thing to make features similar.

$$L_{dissimilarity} = \langle P(\Theta_{t-1}), P(\Theta_0) \rangle + \langle P(\Theta_0), P(\Theta_t) \rangle \quad (3)$$

Tracking Submodule

Figure 3:
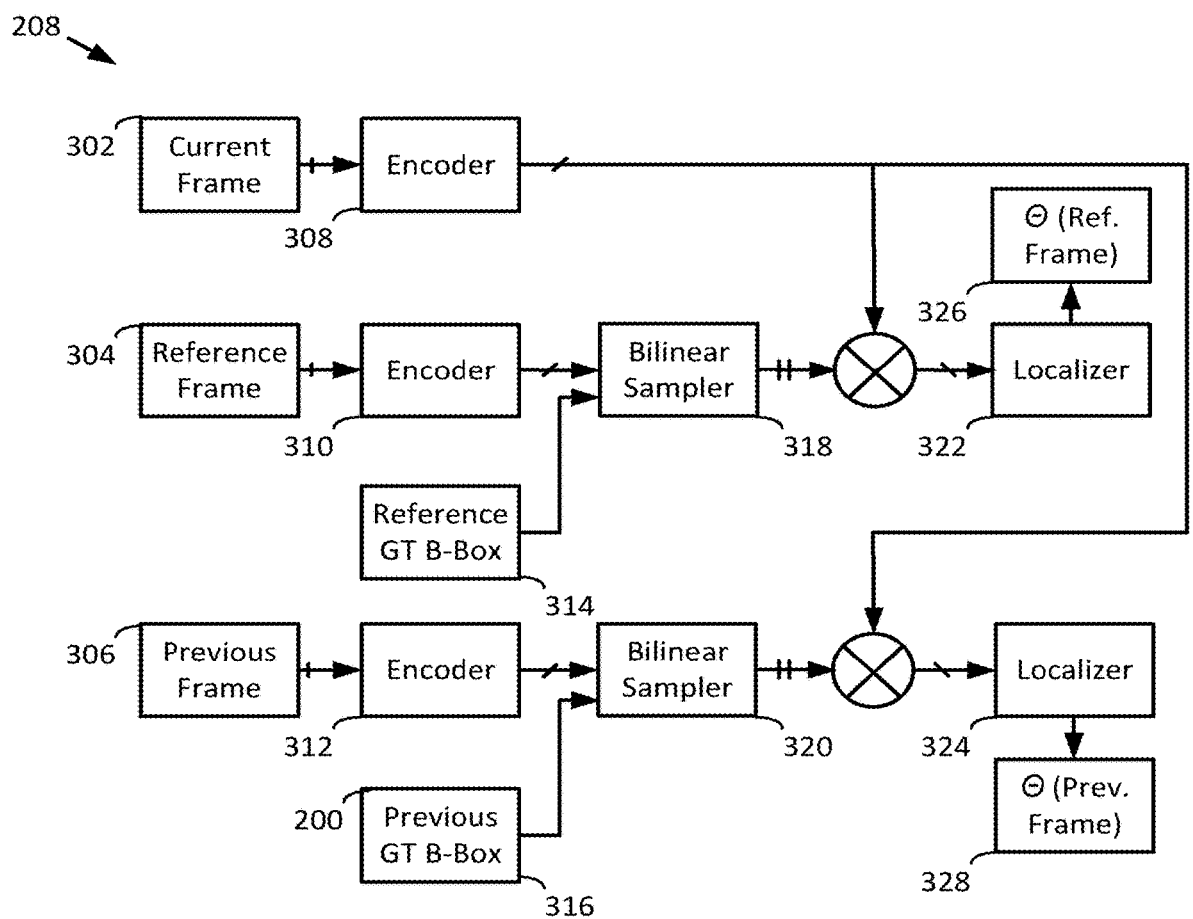
FIG. 3 is a block diagram showing a tracking submodule in accordance with an embodiment.

In an example, the blocks of the tracking submodule of FIG. 3 are described as follows. Many of the blocks (e.g. components) of the tracking submodule are reused in both training and inference (e.g. at run-time for a user), with the exception of the localizer, as its purpose is only to enforce training of discriminative tracking features.

Encoder

In an example, a Siamese network is used as the encoder for the current 302, reference 304 and previous frame 306. In an example, each of the encoders 308, 310 and 312 of the Siamese network is a residual network ResNet-50 architecture without the fifth residual block. In an implemented example, input frames are 3×240×240 (denoted by a line with a single vertical line "I" annotation) and the output features have shape 512×30×30 (denoted by a line with a single forward tilted line annotation "/"). In FIG. 3, annotated lines with two vertical line annotations "II" have shape 512×14×14 and annotated lines with one backward tilted line "\" annotation have shape 900×14×14. It is understood that in the examples herein, where specific dimensions are referenced, the dimensions may be different in various implementations. At inference it is only needed to run the encoder once per frame, and at timestep t features extracted from "previous frame" frame t−1 are re-used in the previous timestep when it was the "current frame".

In an example, two target images are used as input: the reference frame 304 and the previous frame 306. Both of the reference frame 304 and previous frame 306 are used because they serve a complementary purpose: as the video sequence progresses, the previous frame will usually be most similar to the current frame, however the reference frame may still be needed to recover from errors in the previous frame prediction due to "decay", blur, or occlusion, for example. It will be understood that, in an example, the method may be configured to use only the previous frame as the target. In fact, any non-empty subset of the power set of all previous frames may be used as targets. When using more than one target, ranking results may be fused. Described below are fusion functions (e.g. Equations 21 and 22) that work on any number of targets.

The methods are described using $i^t \in \mathbb{R}^{3 \times H_t \times W_t}$ to represent one of these two target images (e.g. frames), with the understanding that the same operations are applied to both target images in parallel. At training and inference time, the object's location (e.g. Reference Frame Ground Truth bounding box 314 from 206) is known in the reference frame 304 due to the nature of the oneshot video object segmentation task (e.g. as processed by the Known Model to provide such a location). At training time, in an example, "teacher forcing" passes the known object location in the previous frame (e.g. Previous Frame Ground Truth bounding box 316). At inference time, the previous frame object location predicted in the previous timestep is used, when the same frame served as the "current frame". The target image (e.g., reference frame) is defined as $i^t \in \mathbb{R}^{3 \times H_t \times W_t}$ and the source image (current frame) as $i^s \in \mathbb{R}^{3 \times H_s \times W_s}$.

The feature extractor is a function:

$$F: \mathbb{R}^{3 \times H \times W} \to \mathbb{R}^{C_f \times H_f \times W_f} \quad (4)$$

where $H_f = H/\text{stride}_F$ and $W_f = W/\text{stride}_F$ for encoder stride $\text{stride}_F$.

Hence the source and target features are:

$$f^s = (i^s) \in \mathbb{R}^{C_f \times H_{fs} \times W_{fs}} \quad (5)$$

$$f^t = F(i^t) \in \mathbb{R}^{C_f \times H_{ft} \times W_{ft}} \quad (6)$$

Bbox Feature Crop

In an example, the ground truth bounding box (e.g. 314 or 316) for the object is downsampled in the target image (i.e., the reference object, or the predicted object in the previous frame) to get bbox$_F$, then crop features f using bbox$_F$ to get $f^c \in \mathbb{R}^{C_f \times H_{fc} \times W_{fc}}$.

Attention Map (Scoremap)

In an example, a normalized cross-correlation function is defined, $$S: \mathbb{R}^{C \times H \times W} \times \mathbb{R}^{C \times H' \times W'} \to \mathbb{R}^{H \times W \times H' \times W'}, \quad (7)$$

which acts on source features $f^s$ and cropped target features $f^{tc}$ to produce an attention map, $$s = S(f^s, f^{tc}) \in \mathbb{R}^{H_{fs} \times W_{fs} \times H_{ftc} \times W_{ftc}}. \quad (8)$$

In an example, the elements of Equation 8 are defined by first defining unnormalized cross-correlation scoremap elements $\tilde{s}_{klij} = \langle \tilde{f}^s_{tkl}, \tilde{f}^{tc}_{tij} \rangle$, then defining elements of s as, $$s_{klij} = \frac{\tilde{s}_{klij}}{\|\tilde{s}_{::ij}\|_F}, \quad (9)$$

where $\|\cdot\|_F$ is the Frobenius norm, and $\tilde{f} = f/\|f\|$ is a normalized feature vector.

Attention Map Resizing

In an example, the attention map s is resized to a fixed size along its source image axes zero and one, independent of source image aspect ratio, since the localizer takes a normalized grid in [−1,1]×[−1,1] as input, and it is assumed that the correspondence scores stored in the attention map are locally linearly related and hence bilinear resizing (via bilinear samplers 318 and 320) is a valid transformation of the attention map. Attention map s is resized along its target image axes two and three.

Geometric Transformation Estimation

The localizer (322 or 324 for the respective target) G predicts a 2D warp $T_g$ of a normalized, linearly spaced grid in [−1,1]×[−1,1] to the location of the target object in the source image. That is, the localizer predicts the location of the tracked object in the current frame.

In an example, the localizer is defined as follows:

$$G: \mathbb{R}^{H \times W \times H' \times W'} \to \mathbb{R}^K, \quad (10)$$

where K is the number of degrees of freedom of the geometric transformation. The input to the localizer is the attention map, and the output is the transformation parameters defining a 2D warp $T_g$, where e.g., $g \in \mathbb{R}^6$ for an affine transformation, corresponding to the localization of the object in the target image.

Localizer G comprises a 2D CNN that takes as input the reshaped attention map of shape $\mathbb{R}^{HW \times H' \times W'}$, and outputs the warp parameter vector $g \in \mathbb{R}^K$. The shape is intentionally HW×H'×W': the source feature map pixels have been flattened into a vector, so that the tensor can be processed by a 2D CNN (which accepts 3D tensors with shape C×H×W, where C represents channels). Respective Θ output 322 and 324 for training is also provided.

Inference System Architecture

Figure 4:
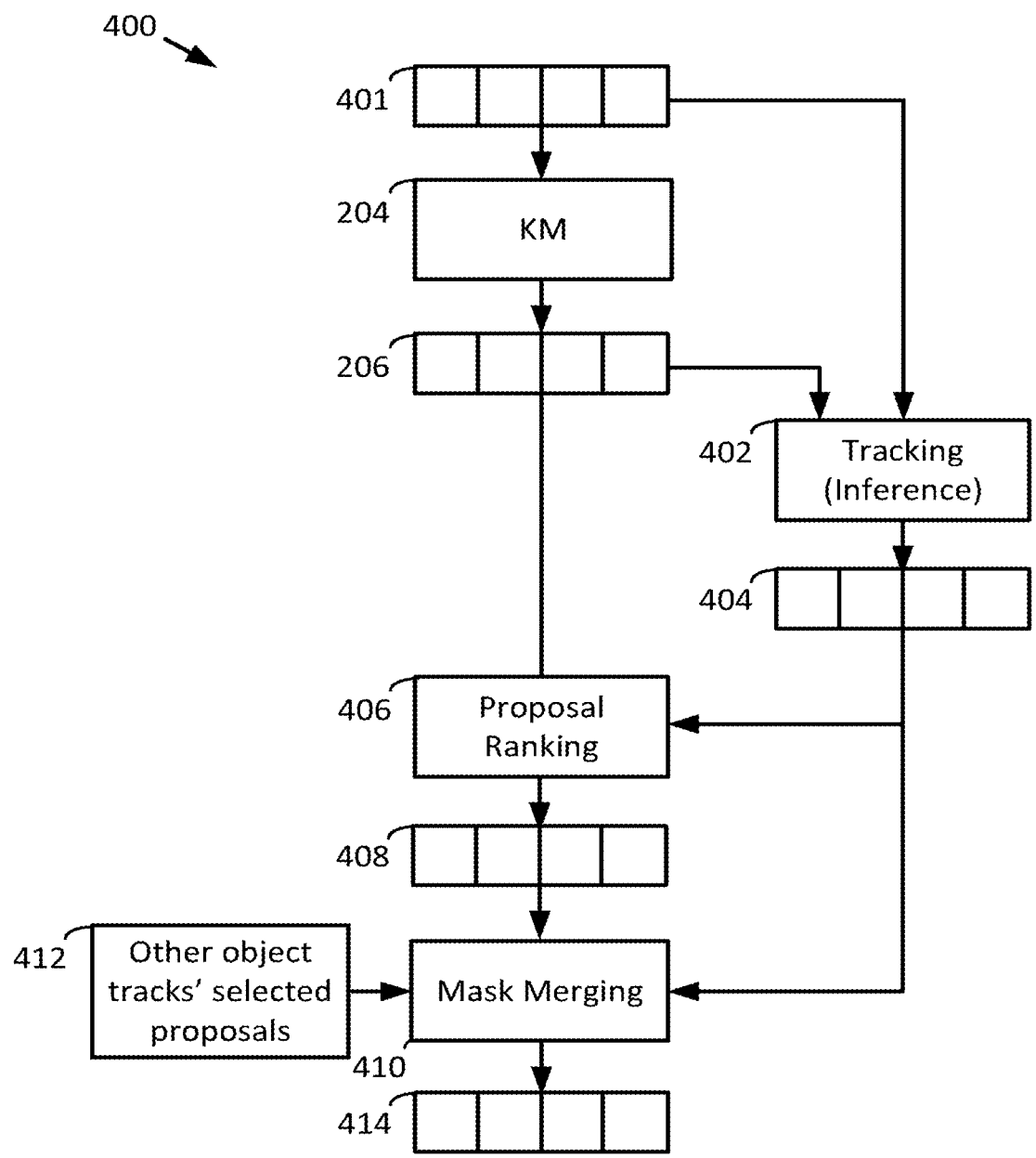
FIG. 4 is a block diagram showing an inference system architecture in accordance with an embodiment.

In an example, FIG. 4 is a block diagram showing a system architecture 400 at inference time to track objects in video frames 401. System architecture 400 uses a trained tracking module 402 (e.g. having a trained model), rather than a tracking module 208 that has a model to be trained (or that is undergoing training). Trained tracking module 402 outputs prediction data 404 as described below. This "runtime" architecture 400 builds on the training system architecture 200 by adding respective proposal ranking and mask merging modules (e.g. 406 and 410), which are described below. Trained tracking module 402 is without the localizer of the tracking module 208, which is only used to enforce training of discriminative tracking features. Hence at inference time the output 404 of the tracking module 402 is a source-target attention scoremap, which the proposal ranking and mask merging modules (406 and 410) each make use of in order to first rank object proposals (e.g. output 408), and then to solve ambiguities in merging any sets of object proposals (e.g. including with other object tracks' selected proposals 412) that may be overlapping to produce a final output 414.

Ranking Proposals

In an example, two formulations for soft mIoU are proposed as ranking functions, which is the metric (i.e. operation or function) used to rank candidate object (e.g. candidate bounding box) proposals that are responsive to the location of the respective objects in the reference frame. As noted, the respective objects and their locations in the reference frame that define the candidate object proposals are determined using the Known Model 204, once only, when processing the video segment. It is these respective objects that are tracked through the frames of the video, and with each processing of a new frame (e.g. the current frame) in the video, the operations herein associate the respective objects to respective locations in the current frame. The operations determine a probability or normalized score distribution representing a respective objects' likeliness to belong to the respective locations in the current frame. The ranking function chooses in accordance with the likeliness.

As discussed further below in relation to mask merging, for any particular pixel in the current frame, two or more respective objects may overlap at that location (e.g. as the video frame is a 2D representation of a 3D space). Only one such object may be in the immediate or foremost foreground. The mask merging function of module 410 assigns the particular pixel to one of the respective objects by selecting a maximum score from the probability or normalized score distribution for each of the respective objects at the location of the particular pixel.

Returning to the ranking function, for both soft mIoU formulations, common inputs are assumed as follows. Input comprises the correspondence scoremap (e.g. normalized cross-correlation) $s \in \mathbb{R}^{H_s \times W_s \times H_t \times W_t}$, where the source frame dimensions are $H_s \times W_s$ and the target frame dimensions are $H_t \times W_t$. From the output 206 of the Known Model 206, there are B candidate bounding box proposals where $b = \{b^{(i)}\}_{i=1}^B$, along with corresponding candidate instance segmentation mask proposals $m = \{m^{(i)}\}_{i=1}^B$, where $m^{(i)} \in \mathbb{R}^{H_s \times W_s}$.

True/False Positives/Negatives Formulation

In the example, a first formulation of soft mIoU uses the correspondence scoremap s to reinterpret the usual formulation of mIoU in terms of true and false positives and negatives. The attention map is used to define a "soft mIoU" over the object proposal using its predicted mask m, which is assumed to be an instance segmentation mask for the object proposal produced by the Known Model 206 (e.g., Mask R-CNN).

First, s is normalized such that max s=1.

True positives TP, false positives FP, and false negatives FN are defined for the foreground (i.e., the object) as follows, $$TP_f = \Sigma_{kl} m_{kl} \max s_{kl::}, \quad (11)$$

$$FP_f = \Sigma_{kl} m_{kl} (1 - \max s_{kl::}), \quad (12)$$

$$FN_f = \Sigma_{kl} \overline{m}_{kl} \max s_{kl::}, \quad (13)$$

Defined are true and false positives and false negatives for the background similarly as:

$$TP_b = \Sigma_{kl} \overline{m}_{kl} (1 - \max s_{kl::}), \quad (14)$$

$$FP_b = \Sigma_{kl} \overline{m}_{kl} \max s_{kl::}, \quad (15)$$

$$FN_b = \Sigma_{kl} m_{kl} (1 - \max s_{kl::}). \quad (16)$$

The motivation behind the definitions of TP, FP and FN is that since $\Sigma_{ij} s_{ijkl} = 1$, a positive correspondence prediction for pixel (k,l) in the source image to the target image is measured by the entropy of the score distribution over all pixels in the source image $s_{kl::}$.

The definitions of soft true and false positives, and false negatives, are used to define a soft mean IoU following the usual definition of mIoU, $$mIoU \equiv \frac{1}{2} \left( \frac{TP_f}{TP_f + FP_f + FN_f} + \frac{TP_b}{TP_b + FP_b + FN_b} \right) \quad (17)$$

At prediction time, the proposal with the highest soft mIoU is selected.

Intersection over Union Formulation

In a second formulation, the "Intersection over Union" formulation of soft mIoU uses the correspondence scoremap s to directly reinterpret intersection I and union U, then defines soft mIoU as I/U.

It is assumed that each target frame pixel corresponds with one source frame pixel, and hence normalize s such that $\Sigma_{kl} s_{klij}=1$ as in Equation 9. After normalization, an intuitive measure of reference pixel (i,j)'s correspondence with the source proposal is $\Sigma_{kl} s_{klij} m_{kl}^s$, where $m^s$ is the instance segmentation mask for the current candidate proposal.

Intersection I is defined as, $$I=\Sigma_{ij} m_{ij}{}' \Sigma_{kl} s_{klij} m_{kl}^s, \quad (18)$$

and union U as, $$U=\Sigma_{ij} m_{ij}{}' + \Sigma_{kl} s_{klij} m_{kl}^s - I, \quad (19)$$

from which the soft mIoU follows as I/U.

Intuitively, the "soft intersection" defined in Equation 18 is the sum of all correspondence scores that belong to both the source proposal and reference patch, i.e., their intersection in the correspondence scoremap. The "soft union" given in Equation 19 is all of the pixels in the reference patch, added to the sum of correspondence scores belonging to the source proposal, minus the intersection defined in Equation 18. The first and second terms in Equation 19 are at least as large as I, since s is normalized such that $\Sigma_{kl} s_{klij}=1$.

Mask Merging

Refined masks extracted from multiple selected object proposals can overlap, in which case the pixel is attributed to the object whose proposal has the maximum single correspondence score for the slice of the correspondence map at pixel (k,l) in the target image, $$b^*=\text{argmax}(\{\max s_{kl:}\}_{b=1}^B) \quad (20)$$

The pixel prediction $\hat{y}_{kl}$ in the video segmentation for the current frame is set to $\hat{y}_{kl}=\hat{y}_{kl}^{b*}$, where $\hat{y}_{kl}^{b*}$ belongs to the object track corresponding to b from Equation 22.

Ranking and Merging Fusion

The system uses two target frames: the given reference frame, and a predicted previous frame, in order to produce correspondence scoremaps $s^{(r)}$ and soft mIoU scores $y^{(r)}$, where r denotes the index of the target frame, and in the present case $r \in (0, 1)$ indexes reference and previous frames. In order to produce a final ranking from the sets of correspondence scoremaps $\{s^{(r)}\}$ and $\{y^{(r)}\}$, fusion functions are defined to produce a single proposal ranking and mask merging order.

Soft mIoU values are fused by computing $$y=\Phi(\{y^{(r)}\}), \quad (21)$$

where $\Phi$ is a pooling function such as max, mean, or harmonic mean. The fused soft mIoU y of Equation 21 is used to produce a single proposal ranking.

Mask merging for a set of B proposals overlapping at pixel (k, l) across multiple scoremaps $\{s^{(r)}\}$ is aggregated by extending the max across slices corresponding to pixel (k, l) in all scoremaps, $$b^*=\text{argmax}(\{\max \{s_{kl:}^r\}\}_{b=1}^B) \quad (22)$$

where r ranges over all target frames.

For object proposal generation, Mask R-CNN is used. YouTube-VOS [17] a dataset of 4453 YouTube video clips and 94 object categories was used, which is, at the time of writing, the largest video object segmentation dataset. The 2018 DAVIS Challenge dataset is used for evaluating, which extends the original DAVIS dataset to 150 sequences including 376 objects.

The system architecture(s) may be configured to execute on more or more computing devices. For example a training architecture may comprise a developer computing device. An inference architecture may comprise a typical user computing device. A developer computing device may comprise a laptop, desktop, PC, server or other computing device that generally has superior resources providing enhanced processing and storage capabilities to a typical user computing device such as a mobile device, smartphone, tablet or standard home laptop, PC, desktop or other device that is not enhanced for gaming or other graphical processing. The features and functions, components, modules, submodules, etc. described herein may be configured using software (e.g. instructions and/or data) stored to a non-transient storage device (e.g. a memory, CD-ROM, DVD-ROM, disc, etc.) for execution by a processing unit of a computing device. Thus, in addition to computing device aspects, a person of ordinary skill will understand that computer program product aspects are disclosed.

Figure 5:
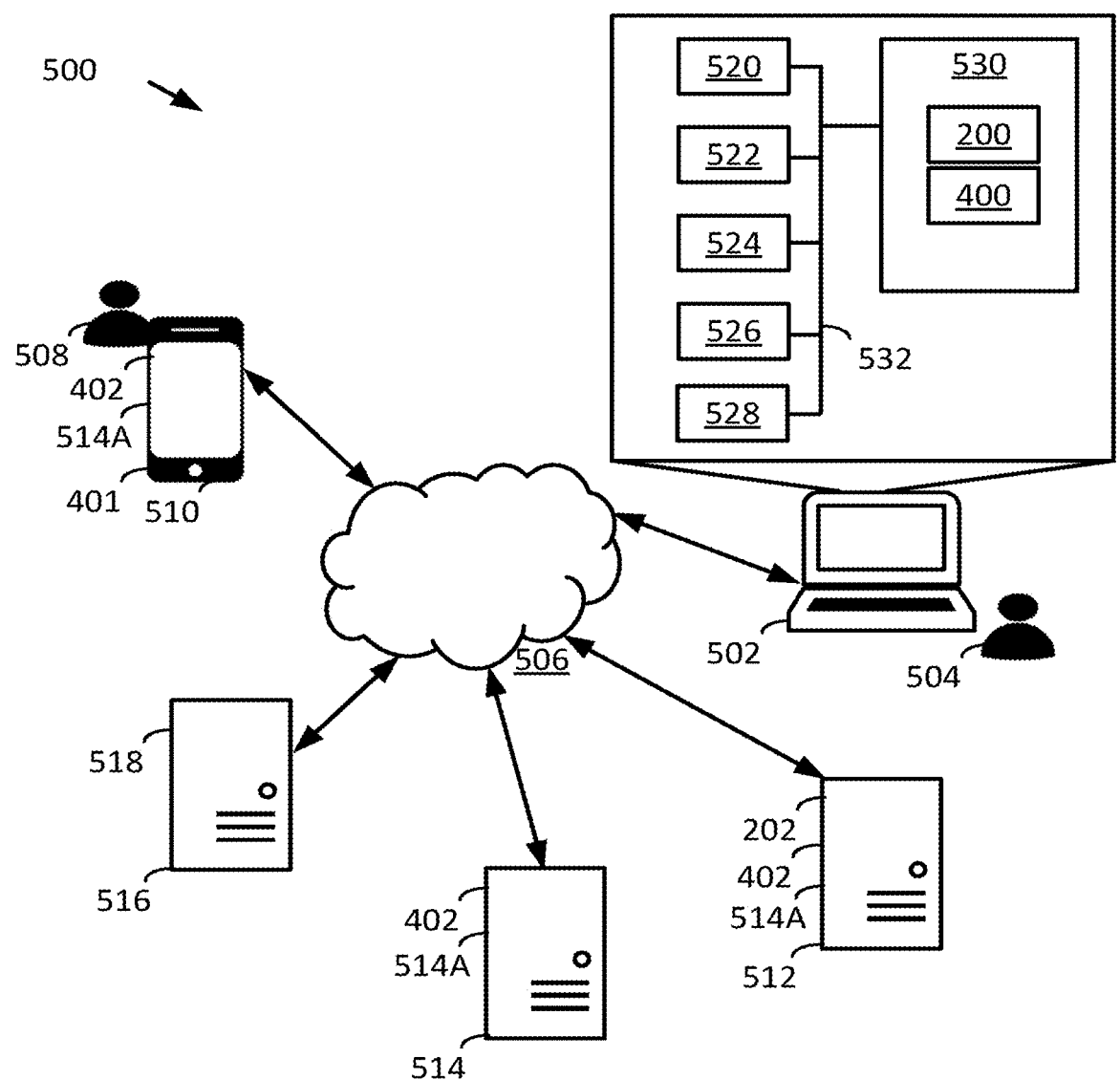
FIG. 5 is a block diagram of a computer network of computing devices, in accordance with an embodiment.

FIG. 5 is a block diagram of an example computer network 500 in which a developer computing device 502 operated by a user/developer 504 is in communication via a communications network 506 in accordance with an example. Also shown is a second user 508 and a target computing device 510 configured for communications via communications network 506. Second user 510 may be a consumer. Server computing devices 512, 514 and 6516 are in communication with communications network 506, for example, to communicate with one or more of devices 502 and 510 as further described.

Developer computing device 502 is configured to train the tracking module 208 (e.g. its model), using system architecture 200. Developer computing device 502 may have a higher storage, processing power, and memory than the target device 510. Examples of developer computing device 502 may include, but are not limited to, a computing device built to maximize graphics or other processing performance. While depicted as a laptop, other form factors for computing device 502 are included that meet the task. It is understood that, in some examples, a developer computing device may include a plurality of devices. In one example, a first computing device instructs a more powerful second computing device to perform the training task (or components thereof). In some instances a plurality of computing devices perform the task in cooperation.

Target computing device 510 is configured to execute an inference model (e.g. a trained model) such as trained tracking module 402. Target computing device 510 may have a reduced storage, processing power, and memory in comparison to the developer device 502. Examples of target computing device 510 may include, but are not limited to, a personal computer, a laptop computer, a tablet computer, a notebook computer, a hand-held computer, a personal digital assistant (PDA), a mobile phone, a smart phone, and any other type of computing device that may be configured to store data and software instructions, execute software instructions to perform operations, and/or display information on an interface module, consistent with disclosed embodiments.

Developer computing device 502 is configured, in an example, to train the tracking model to track segmented objects in video frames (e.g. 202) using training data. Training data comprising a plurality of training data video frames (e.g. 202) may be stored at server computing device 512 or the training data video frames (e.g. 202) may be stored and utilized on board developer computing device 502. The developer computing device 502 may store the trained model (e.g. as module 402, adapted as in system architecture 400) in server 512 (or another server, not shown) to be fetched by target device 510 for execution. Target device 510 may also store the run-time model (as module 402) on board for execution. In an example (not shown), system architecture 400 is executed by a server computing device for or on behalf of target device 510 and target device need not store system architecture 400.

In an example, target computing device 510 is configured to receive the run-time model (as module 402) developed by developer computing device 502 as part of architecture 400. Target computing device 510 may receive the run-time model (as module 402) through communication via communications network 506 to developer computing device 502 or from server 512, or any other method to digitally transfer data (e.g. a download from an application store (e.g. an e-commerce service provided by a server computing device 514)). The run-time model is typically incorporated into a run-time application 514A (e.g. downloaded from an application store) that executes the model (as module 402). User 508 of target computing device 510 provides a video (e.g. a selfie video) having frames (e.g. such as 401) to the run-time application 514A. The provided video (e.g. frames 401) may be stored on target computing device 510, received from a server or other computing device (e.g. via a web (e.g. http) or other communication (e.g. text message, instant message, short message service, proprietary message, email, etc.)), acquired from an input device of or coupled to target computing device 510 (e.g. a camera), or through other methods capable of providing the video.

In an example, run-time application 514A provides an augmented reality experience, using module 402 to track objects between frames and apply an effect to the tracked object in each frame. In accordance with examples, the effect is a hair effect, a makeup effect, a nail effect, etc. The run-time application 514A executes the run-time model 402 to determine the location of the object (which may be more than one object such as a set of nails on a hand) in each frame (image) and produces an augmented image or video with the effect applied at the location(s) tracked by the model. Image processing techniques (e.g. via an overlay/change of pixel data) are used to apply the effect at the tracked locations. The augmented video may be provided for display on device 510 or communicated by it.

In an example, an effect to be applied to an image frame of the video is associated with one or both of a product and a service (e.g. a product and/or service). In an example, the effect is a makeup effect associated with a product. In an example, the effect is a nail treatment effect associated with a service and a product. In an example, the application provides an interface to an e-commerce service (e.g. an application 518) available from server computing device 516 to purchase the product for the makeup effect or the service and product for the skin treatment effect. Payment services and a payment network are not illustrated in FIG. 5.

In other run-time applications, tracking module 402 is used to provide hair colour, make-up try-on, or clothing try-on. In other applications, which need not be augmented reality based, tracking module 402 is used directly in tracking applications such as player tracking in sports analytics, person tracking in security footage, and car and road obstacle tracking in self-driving vehicle applications. Objects may be annotated (e.g. the source video is updated through image processing) such as through highlighting a bounding box or a mask outline or in another manner to visualize the object in the video.

Developer computing device 502, in accordance with one of more aspects of the present disclosure, may comprise one or more processors 520, one or more input devices 522, a gesture-based I/O device 524, one or more communication units 526 and one or more output devices 528. Developer computing device 502 also includes one or more storage devices 530 storing one or more modules and/or data of system architecture 200 and 400.

Storage device(s) 530 may store additional modules such as an operating system and other modules (all not shown) comprising communication modules; photo (image/media) editor; media player and/or streaming module; browser module; etc. Storage devices may be referenced as storage units herein.

One or more processors 520 may implement functionality and/or execute instructions within computing device 502. For example, processors 520 may be configured to receive instructions and/or data from storage devices 530 to execute the functionality of system architecture 200 and/or 400, among others, including run-time application 514A. Developer computing device 502 may store data/information to storage devices 530. It is understood that operations may not fall exactly within specific modules such that one module may assist with the functionality of another.

One or more processors 520 send requests to translate an image or video stored on board or acquired from a camera 704 from a first domain space to a second domain space according to an effect. The processing unit 702 provides the plurality of unpaired images 102 to the first model module 104 to train a first model. It then provides the plurality of unpaired images 102 to the trained first model to generate a plurality of paired images 106 provided to train a run-time model utilizing run-time module 112. Processing unit may request an optional filter 114 to filter the plurality of paired images before providing to train the run-time model.

Communication channels 532 may couple each of the components 520, 522, 524, 526, 528, and 530 and any modules of 200 and 400 for inter-component communications, whether communicatively, physically and/or operatively. In some examples, communication channels 532 may include a system bus, a network connection, an inter-process communication data structure, or any other method for communicating data.

Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Developer computing device 502 may generate output for display on a screen of gesture-based I/O device 524 or in some examples, for display by a projector, monitor or other display device. It will be understood that gesture-based I/O device 524 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 524 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 524. Gesture-based I/O device 524 and may also include non-tap gestures. Gesture-based I/O device 524 may output or display information, such as graphical user interface, to a user/developer. The gesture-based I/O device 524 may present various applications, functions and capabilities of the developer computing device 502 including, for example, an image processing application to view images, process the images and display new images, messaging applications, and other applications or functions among others.

The one or more communication units 532 may communicate with external devices (e.g. server 512, target computing device 510) such as for the purposes as described and/or for other purposes (e.g. printing) such as via communications network 506 by transmitting and/or receiving network signals on the one or more networks. The communication units may include various antennae and/or network interface cards, chips (e.g. Global Positioning Satellite (GPS)), etc. for wireless and/or wired communications.

Input devices 522 and output devices 528 may include any of one or more buttons, switches, pointing devices, cameras, a keyboard, a microphone, one or more sensors (e.g. biometric, etc.), a speaker, a bell, one or more lights, a haptic (vibrating) device, etc. One or more of same may be coupled via a universal serial bus (USB) or other communication channel (e.g. 532). A camera (an input device 522) may be front-oriented (i.e. on a same side as) to permit a user to capture image(s) using the camera while looking at the gesture based I/O device 524 to take a "selfie".

The one or more storage devices 730 may take different forms and/or configurations, for example, as short-term memory or long-term memory. Storage devices 730 may be configured for short-term storage of information as volatile memory, which does not retain stored contents when power is removed. Volatile memory examples include random access memory (RAM), dynamic random access memory (DRAM), static random access memory (SRAM), etc. Storage devices 730, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

It is understood that target computing device 510 may be similarly configured as developer computing device 502, in an example, albeit with fewer components to develop the model(s).

Figure 6:
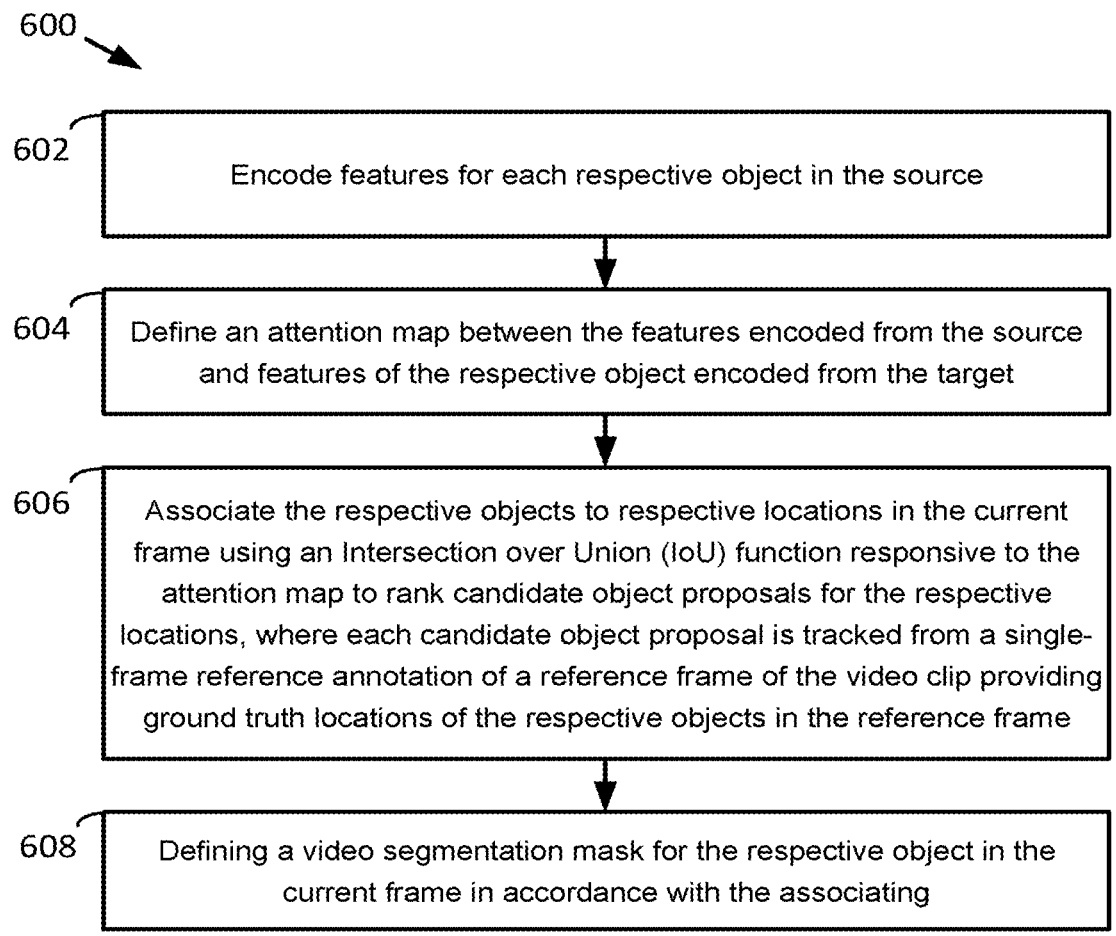
FIGS. 6, 7, 8A, 8B and 9 are flowcharts of respective operations of computing devices in accordance with respective embodiments.

FIG. 6 is a flowchart of operations 600 of a computing device such as device 510, though other device are contemplated. Operations 600 provide, in an embodiment, a method of semi-supervised video object segmentation to track and segment one or more objects throughout a video clip comprising a sequence of frames including a previous frame and a current frame, the previous frame defining a target and the current frame a source. At 602 operations encode features for each respective object in the source. At 604 operations define an attention map between the features encoded from the source and features of the respective object encoded from the target. At 606 operations associate the respective objects to respective locations in the current frame using an Intersection over Union (IoU) function responsive to the attention map to rank candidate object proposals for the respective locations, where each candidate object proposal is tracked from a single-frame reference annotation of a reference frame of the video clip providing ground truth locations of the respective objects in the reference frame. And, at 608 operations define a video segmentation mask for the respective object in the current frame in accordance with the associating. In an example, for each candidate object proposal the Intersection over Union (IoU) function provides an IoU value that is responsive to the attention map with which to rank the candidate object proposals. The ranking selects a highest IoU value for the respective object to identify the respective object in the current frame thereby tracking the respective object from the reference frame through the previous frame to the current frame.

In an example there is provided a method of semi-supervised video object segmentation to track and segment one or more objects throughout a video clip comprising a sequence of frames including respective previous frames and a current frame, each of the respective previous frames defining a respective target and the current frame a source. The method comprises: for each respective object: encoding features of the respective object in the source; and for each of the respective targets, defining respective attention maps between the features encoded from the source and features of the respective object encoded from the respective target. The respective objects are associated to respective locations in the current frame using an Intersection over Union (IoU) function responsive to the respective attention maps to rank candidate object proposals for the respective locations, where each candidate object proposal is tracked from a single-frame reference annotation of a reference frame of the video clip providing ground truth locations of the respective objects in the reference frame. A video segmentation mask for each respective object in the current frame is defined in accordance with the associating.

In an example, for each candidate object proposal the Intersection over Union (IoU) function provides an IoU value that is responsive to each attention map with which to rank the candidate object proposals, the ranking selecting a highest IoU value for the respective object to identify the respective object in the current frame thereby tracking the respective object from the reference frame through the previous frame to the current frame. The IoU value may be a fusion of respective IoU values for the respective object from each of the respective attention maps.

In an example, defining a video segmentation mask comprises removing pixel-wise overlap from the respective objects in the current frame.

In an example, the video segmentation mask is used to apply an effect to the respective object for display.

Figure 7:
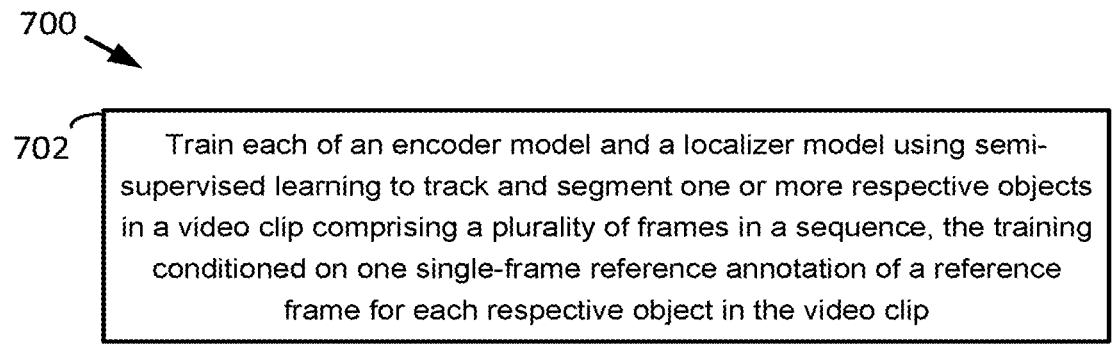

FIG. 7 is a flowchart of operations 700 for a computing device such as device 502, though others are contemplated (e.g. server 512). At 602, operations train each of an encoder model and a localizer model using semi-supervised learning to track and segment one or more respective objects in a video clip comprising a plurality of frames in a sequence, the training conditioned on one single-frame reference annotation of a reference frame for each respective object in the video clip. In an example, the encoder model comprises a neural network model configured to encode object features; the encoder model is used during training to encode object features in the reference frame, a current frame and a previous frame to produce respective object features from each of the frames; and the localizer model is used during training to localize objects and to enforce that the encoder model learns discriminative object features to enable tracking of the respective objects from the reference frame to the current frame via the previous frame.

In an example, the encoder model is a CNN-based model. In an example, the encoder model and localizer model are conditioned using a tracking loss and at least one object feature encoding loss. In an example, one object feature encoding loss is a similarity loss and another object feature encoding loss is a dissimilarity loss. In an example, the tracking loss is responsive to a geometric transformation estimation that predicts a location of the respective object in the current frame from the location in, respectively, the reference frame or previous frame.

In an example, the geometric transformation estimation is performed by the localizer model configured to predict transformation parameters defining a 2D warp $\tau_g$, responsive to respectively, a respective attention map correlating object features of the current frame and respectively object features in one of the reference frame and previous frame.

In an example, the localizer model is configured to receive each respective attention map having correlating scores stored in a normalized grid in $[-1,1] \times [-1,1]$ to the location of the respective object in the current frame.

In an example, the localizer model comprises a 2D convolutional neural network (CNN).

In an example, the localizer model is conditioned using the tracking loss and the at least one object feature encoding loss.

In an example: $\Theta_{t-1}$ is a theta computed by the localizer model (G) using the previous frame; $\Theta_0$ is the theta computed by the localizer model using the reference frame; $\Theta_t$ is a ground truth theta for the current frame; $G(\Theta_t)$ corresponds to a sampling grid used to extract a patch from the object features of the respective object extracted from the current frame using transformation parameters $\Theta_t$, and $P(\Theta^t)$ corresponds to the object features of the respective object extracted from the current frame using $\Theta_t$; the tracking loss is defined as $L_{tracking} = L1(G(\Theta_{t-1}), G(\Theta_t)) + L1(G(\Theta_o), G(\Theta_t))$ where L1 is a smooth L1 loss; the similarity loss is defined as $L_{similarity} = -\langle P(\Theta_{t-1}), P(\Theta_t)\rangle - \langle P(\Theta_0), P(\Theta_t)\rangle$; and the dissimilarity loss is defined as $L_{dissimilarity} = \langle P(\Theta_{t-1}), P(\Theta_t)\rangle + \langle P(\Theta_0), P(\Theta_t)\rangle$.

In an example, the operations at 700 may include using a neural network model conditioned to detect objects in static image datasets to produce the reference annotation, the detecting producing a ground truth location for each of the respective objects.

In an example, the operations at 700 may include adapting the encoder model once trained to define a run-time model to track and segment one or more respective objects in video clips; and defining a run-time application that uses the encoder model as trained and adapted, the run-time application applying an effect to the respective objects to provide a modified video clip for display.

Figure 8A:
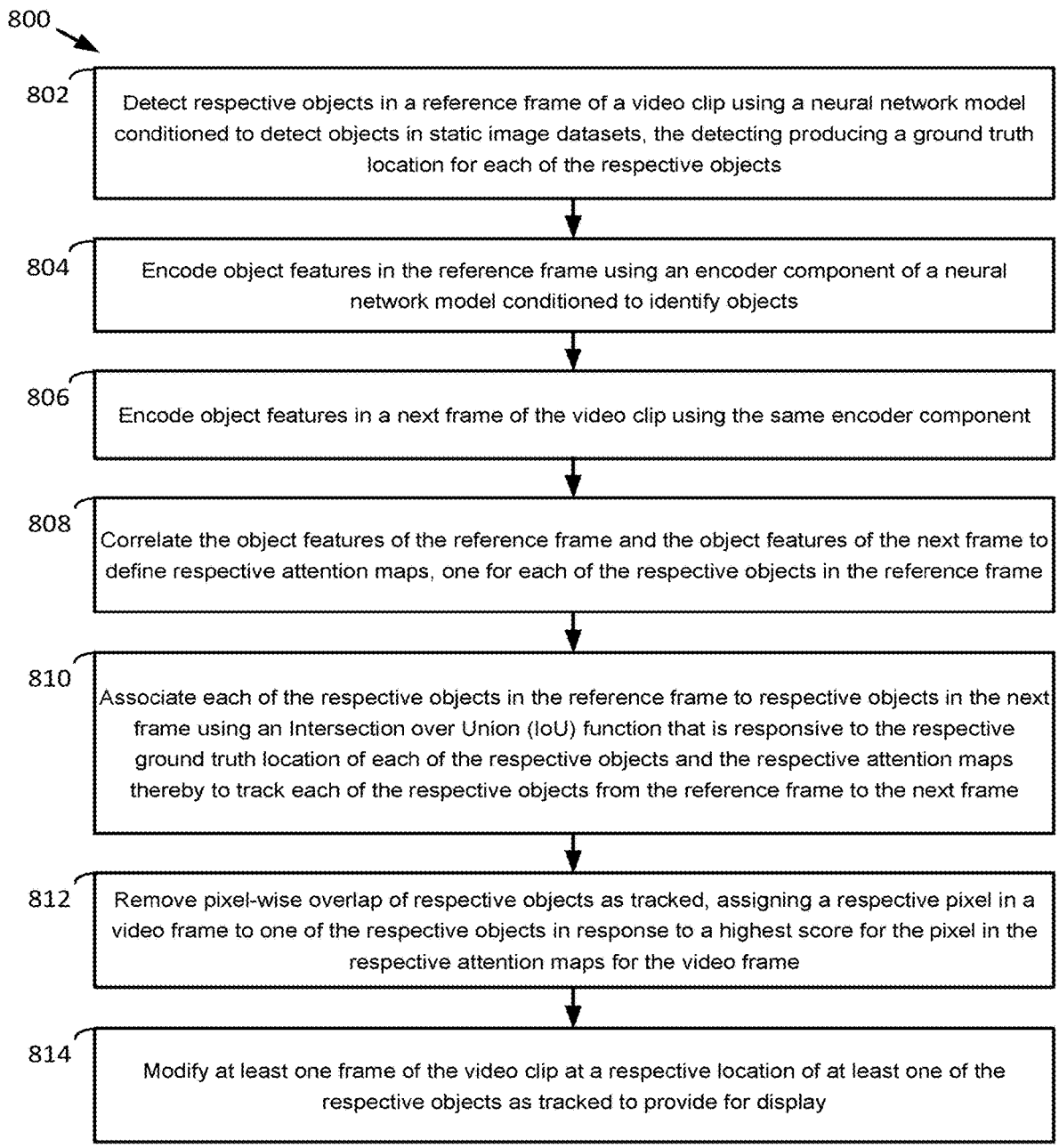

FIG. 8A is a flowchart of operations 800 to perform a method in accordance with an embodiment for a computing device such as device 502 however other devices are contemplated such as device 516. At 802 operations detect respective objects in a reference frame of a video clip using a neural network model conditioned to detect objects in static image datasets, the detecting producing a ground truth location for each of the respective objects. At 804 operations encode object features in the reference frame using an encoder component of a neural network model conditioned to identify objects. At 806, operations encode object features in a next frame of the video clip using the same encoder component. At 808, operations correlate the object features of the reference frame and the object features of the next frame to define respective attention maps, one for each of the respective objects in the reference frame. And at 806, operations associate each of the respective objects in the reference frame to respective objects in the next frame using an Intersection over Union (IoU) function that is responsive to the respective ground truth location of each of the respective objects and the respective attention maps thereby to track each of the respective objects from the reference frame to the next frame.

Figure 8B:
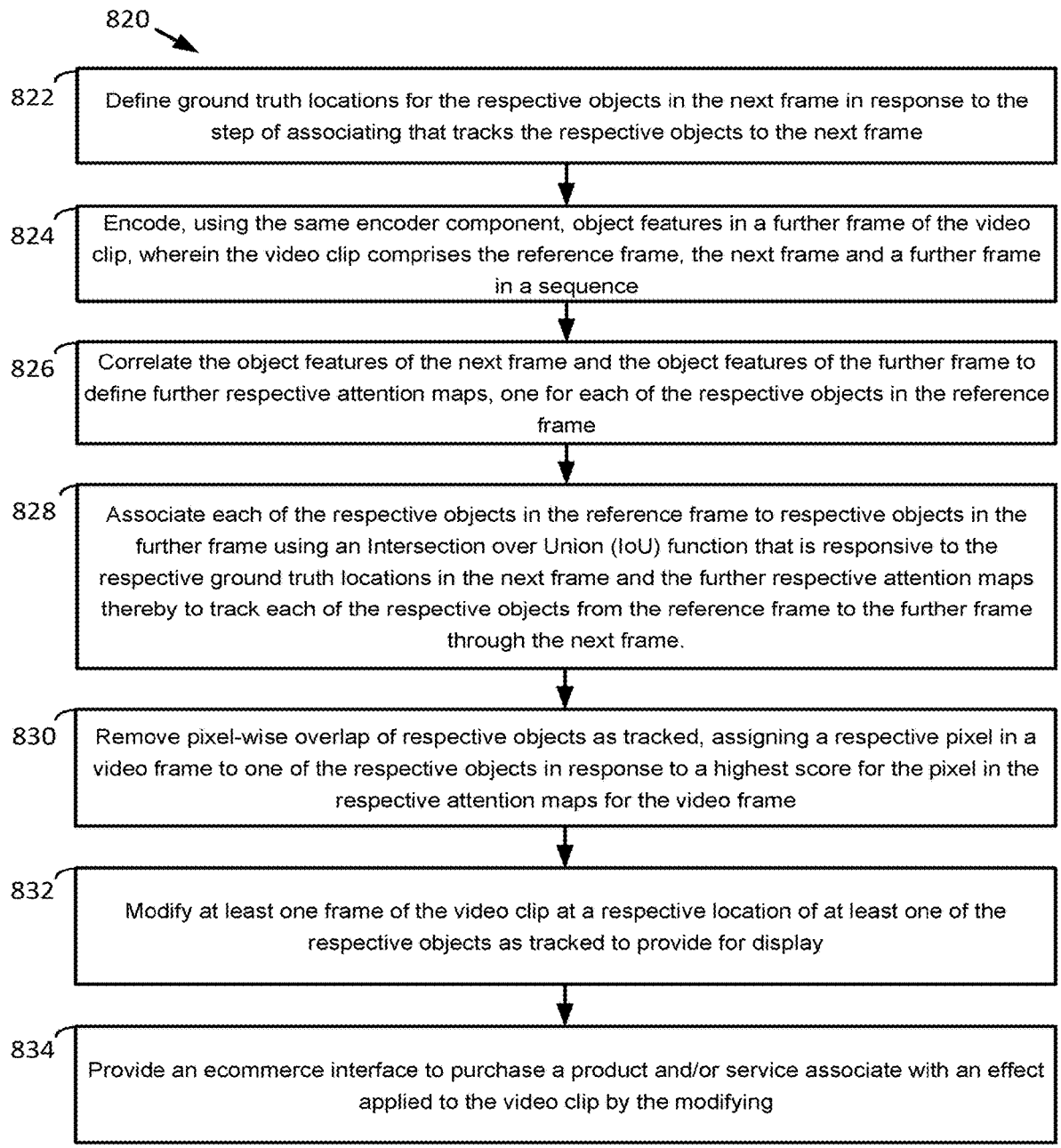

FIG. 8B is a flowchart of operations 820 to perform a method in accordance with an embodiment for a computing device such as device 502 however other devices are contemplated such as device 516. At 822, operations define ground truth locations for the respective objects in the next frame in response to the step of associating that tracks the respective objects to the next frame;

At 824, operations encode, using the same encoder component (as at operations 804), object features in a further frame of the video clip, wherein the video clip comprises the reference frame, the next frame and a further frame in a sequence. For example the further frame is a current frame and the next frame is a previous frame to the current frame.

At 826, operations correlate the object features of the next frame and the object features of the further frame to define further respective attention maps, one for each of the respective objects in the reference frame. And at 828, operations associate each of the respective objects in the reference frame to respective objects in the further frame using an Intersection over Union (IoU) function that is responsive to the respective ground truth locations in the next frame and the further respective attention maps thereby to track each of the respective objects from the reference frame to the further frame through the next frame.

In an example operations 800 or 820 are configured at 812 and 830 respectively to remove pixel-wise overlap of respective objects as tracked, assigning a respective pixel in a video frame to one of the respective objects in response to a highest score for the pixel in the respective attention maps for the video frame.

In an example operations 800 are configured (not shown) to perform a fusion function to produce a single proposal ranking from the candidate object proposals, fusing a value of the IoU function for a respective object, where the fusion function is a pooling function.

In an example operations 800 or 820 are configured at 814 and 832 respectively to modify at least one frame of the video clip at a respective location of at least one of the respective objects as tracked to provide for display.

In an example, modifying applies an effect, which effect comprises one of a virtual reality (VR) effect, an augmented reality (AR) effect or a mixed reality (MR) effect. In an example, such as a virtual try on or try out example, the effect is associated to one or both of a product and a service and operations 800 or 820 or both (e.g. but only shown at 834) comprise providing an ecommerce interface to purchase one or both of the product and the service.

In an example, at least portions of operations 800 and/or 820 are performed using a Siamese network architecture to process frames of the video clip.

Figure 9:
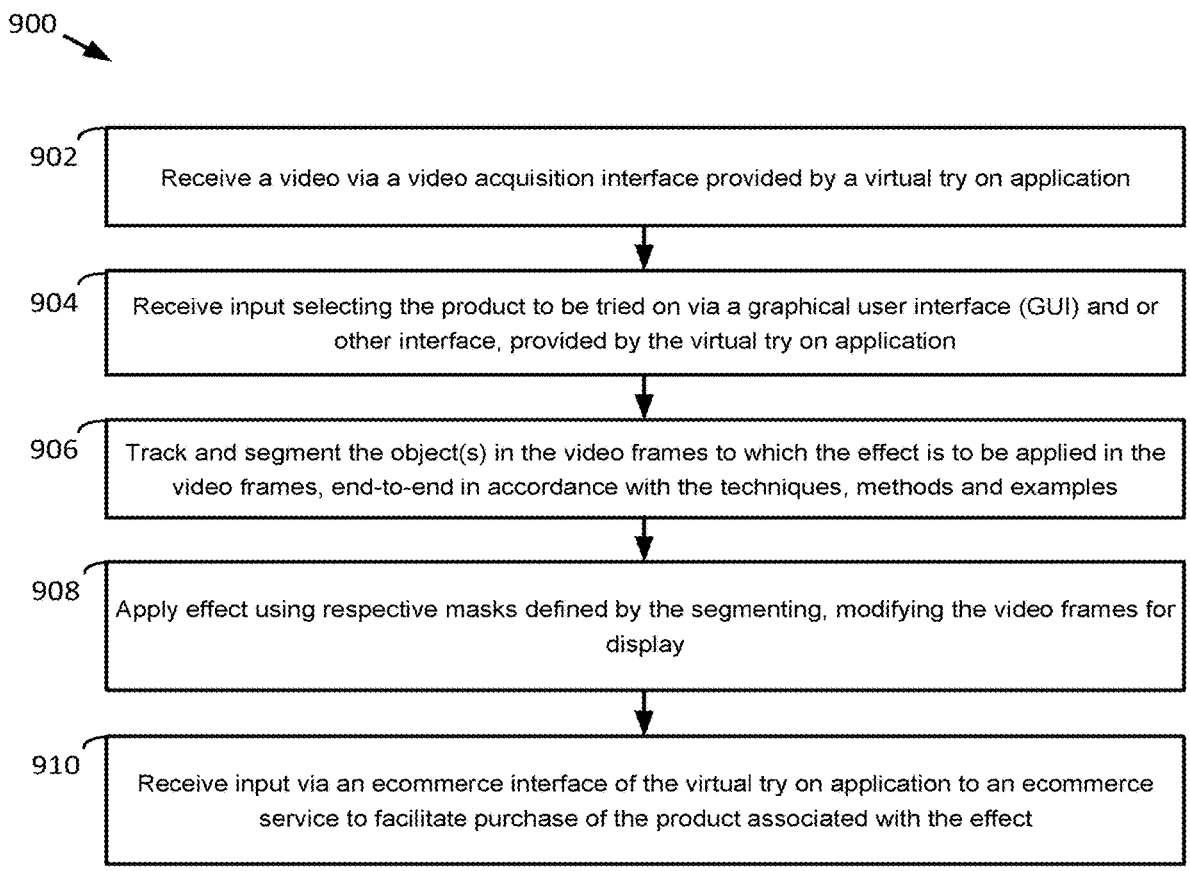

FIG. 9 is a flowchart of operations 900 in accordance with an example, for a computing device such as computing device 510. Other devices such as device 502, 512, 514 and/or 516 are contemplated. Operations 900 comprise operations of a virtual try on application providing augmented reality, modifying a video to apply an effect associated with a product such as a hair color product, a nail color/nail effect product or a makeup product such as lipstick. At 902 a video is received such as a selfie video via a camera (e.g. on the computing device) via a video acquisition interface provided by the virtual try on application. The video may be displayed (e.g. in real-time) as received via a display device (e.g. on the computing device). At 904, via a graphical user interface (GUI) and or other interface, provided by the virtual try on application, input is received selecting the product to be tried on. For example, in a virtual try on application for nails, a nail polish product or effect is selected. The nail polish selection may include input for a color, a finish (matte, shiny, sparkles, stripes, white tips, etc.) In an example, input selecting the effect or product may be received before the video receiving is started. In an example, the try on interface permits selection of effects/products "on the fly" via an interface overlaid (or otherwise) during a display of the video.

At 906, the object(s) in the video frames to which the effect is to be applied are tracked and segmented in the video frames, end-to-end, in accordance with the techniques, methods and examples herein. Segmentation defines respective masks for the respective object(s) in each of the frames. At 908 the effect is applied using the respective masks, modifying the video frames for display via the display device. It is understood that operations at 902, 904 and 906 overlap such that the some video frames are processed for tracking and segmenting, and applying the effect as other frames are received to provide an augmented reality experience for a user. At 910, input is received via an ecommerce interface of the virtual try on application to an ecommerce service (e.g. provided by server computing device 516), to facilitate purchase of the product associated with the effect. Though operations 900 are described for a product, in examples, a service or both a product and a service are contemplated. That is, an effect to be applied is associated with any of a product and/or a service. The ecommerce interface and service may also facilitate purchase of other (e.g. suggested or related) products or services. The ecommerce service may have a recommendation component to recommend products or services (e.g. hair products, makeup products, clothes products, footwear products, head ware products and accessories products, etc. that have a relation to the product associated with the effect.

Practical implementation may include any or all of the features described herein. These and other aspects, features and various combinations may be expressed as methods, apparatus, systems, means for performing functions, program products, and in other ways, combining the features described herein. A number of embodiments or examples have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments or examples are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

The references below are incorporated herein by reference.

[1] The 2nd large-scale video object segmentation challenge. At youtube-vos.org/challenge/2019, 2019.

[2] Linchao Bao, Baoyuan Wu, and Wei Liu. CNN in MRF: video object segmentation via inference in A cnn-based higher-order spatio-temporal MRF. In Computer Vision and Pattern Recognition (CVPR), 2018.

[3] Sergi Caelles, Kevis-Kokitsi Maninis, Jordi Pont-Tuset, Laura Leal-Taix'e, Daniel Cremers, and Luc Van Gool. Oneshot video object segmentation. In CVPR, 2017.

[4] Sergi Caelles, Alberto Montes, Kevis-Kokitsi Maninis, Yuhua Chen, Luc Van Gool, Federico Perazzi, and Jordi Pont-Tuset. The 2018 davis challenge on video object segmentation. arXiv:1803.00557, 2018.

[5] Jingchun Cheng, Yi-Hsuan Tsai, Wei-Chih Hung, Shengjin Wang, and Ming-Hsuan Yang. Fast and accurate online video object segmentation via tracking parts. In CVPR, 2018.

[6] Jingchun Cheng, Yi-Hsuan Tsai, Shengjin Wang, and Ming-Hsuan Yang. Segflow: Joint learning for video object segmentation and optical flow. In ICCV, 2017.

[7] Suyog Dutt Jain, Bo Xiong, and Kristen Grauman. Fusionseg: Learning to combine motion and appearance for fully automatic segmentation of generic objects in videos. In CVPR, 2017.

[8] Bumsub Ham, Minsu Cho, Cordelia Schmid, and Jean Ponce. Proposal flow. In Proceedings of the IEEE Conference on Computer Vision and Pattern Recognition, 2016.

[9] Kaiming He, Georgia Gkioxari, Piotr Doll'ar, and Ross B. Girshick. Mask r-cnn. 2017 IEEE International Conference on Computer Vision (ICCV), 2017.

[10] Ping Hu, Gang Wang, Xiangfei Kong, Jason Kuen, and Yap-Peng Tan. Motion-guided cascaded refinement network for video object segmentation. In CVPR, 2018.

[11] Yuan-Ting Hu, Jia-Bin Huang, and Alexander Schwing. Maskrnn: Instance level video object segmentation. In Advances in Neural Information Processing Systems 30, 2017.

[12] Varun Jampani, Raghudeep Gadde, and Peter V. Gehler. Video propagation networks. In CVPR, 2017.

[13] Won-Dong Jang and Chang-Su Kim. Online video object segmentation via convolutional trident network. In The IEEE Conference on Computer Vision and Pattern Recognition (CVPR), 2017.

[14] Anna Khoreva, Federico Perazzi, Rodrigo Benenson, Bernt Schiele, and Alexander Sorkine-Hornung. Learning video object segmentation from static images. In CVPR, 2017.

[15] Xiaoxiao Li and Chen Change Loy. Video object segmentation with joint re-identification and attention-aware mask propagation. In The European Conference on Computer Vision (ECCV), 2018.

[16] Rosanne Liu, Joel Lehman, Piero Molino, Felipe Petroski Such, Eric Frank, Alex Sergeev, and Jason Yosinski. An intriguing failing of convolutional neural networks and the coordconv solution. In Advances in Neural Information Processing Systems, 2018.

[17] Jonathon Luiten, Paul Voigtlaender, and Bastian Leibe. Premvos: Proposal-generation, refinement and merging for video object segmentation. In Asian Conference on Computer Vision, 2018.

[18] Kevis-Kokitsi Maninis, Sergi Caelles, Yuhua Chen, Jordi Pont-Tuset, Laura Leal-Taix'e, Daniel Cremers, and Luc Van Gool. Video object segmentation without temporal information. 2018.

[19] Francisco Massa and Ross Girshick. maskrcnn-benchmark: Fast, modular reference implementation of Instance Segmentation and Object Detection algorithms in PyTorch. At github.com/facebookresearch/maskrcnn-benchmark, 2018.

[20] Seoung Wug Oh, Joon-Young Lee, Ning Xu, and Seon Joo Kim. Video object segmentation using space-time memory networks. ICCV, 2019.

[21] Seoung Wug Oh, Joon-Young Lee, Kalyan Sunkavalli, and Seon Joo Kim. Fast video object segmentation by referenceguided mask propagation. In CVPR, 2018.

[22] F. Perazzi, J. Pont-Tuset, B. McWilliams, L. Van Gool, M. Gross, and A. Sorkine-Hornung. A benchmark dataset and evaluation methodology for video object segmentation. In Computer Vision and Pattern Recognition, 2016.

[23] I. Rocco, R. Arandjelovi'c, and J. Sivic. Convolutional neural network architecture for geometric matching. In Proceedings of the IEEE Conference on Computer Vision and Pattern Recognition, 2017.

[24] I. Rocco, R. Arandjelovi'c, and J. Sivic. End-to-end weakly-supervised semantic alignment. 2018.

[25] Amaia Salvador, Miriam Bellver, Manel Baradad, Ferran Marques, Jordi Torres, and Xavier Giro-i Nieto. Recurrent neural networks for semantic instance segmentation. In arXiv:1712.00617, 2017.

[26] Pavel Tokmakov, Karteek Alahari, and Cordelia Schmid. Learning video object segmentation with visual memory. In ICCV, 2017.

[27] Yi-Hsuan Tsai, Ming-Hsuan Yang, and Michael J. Black. Video segmentation via object flow. In CVPR, 2016.

[28] Paul Voigtlaender, Yuning Chai, Florian Schroff, Hartwig Adam, Bastian Leibe, and Liang-Chieh Chen. Feelvos: Fast end-to-end embedding learning for video object segmentation. In CVPR, 2019.

[29] Paul Voigtlaender and Bastian Leibe. Online adaptation of convolutional neural networks for video object segmentation. In BMVC, 2017.

[30] Paul Voigtlaender, Jonathon Luiten, and Bastian Leibe. BoLTVOS: Box-Level Tracking for Video Object Segmentation. arXiv:1904.04552, 2019.

[31] Xiaolong Wang, Allan Jabri, and Alexei A. Efros. Learning correspondence from the cycle-consistency of time. In CVPR, 2019.

[32] ZiqinWang, Jun Xu, Li Liu, Fan Zhu, and Ling Shao. Ranet: Ranking attention network for fast video object segmentation. In ICCV, 2019.

[33] Ning Xu, Linjie Yang, Yuchen Fan, Jianchao Yang, Dingcheng Yue, Yuchen Liang, Brian Price, Scott Cohen, and Thomas Huang. Youtube-vos: Sequence-to-sequence video object segmentation. In ECCV, 2018.

[34] Ning Xu, Linjie Yang, Yuchen Fan, Dingcheng Yue, Yuchen Liang, Jianchao Yang, and Thomas S. Huang. Youtubevos: A large-scale video object segmentation benchmark. In ECCV, 2018.

[35] Linjie Yang, Yanran Wang, Xuehan Xiong, Jianchao Yang, and Aggelos K. Katsaggelos. Efficient video object segmentation via network modulation. In CVPR, 2018.

The invention claimed is:

1. A method of semi-supervised video object segmentation to track and segment one or more objects throughout a video clip comprising a sequence of frames including respective previous frames and a current frame, each of the respective previous frames defining a respective target and the current frame a source, the method comprising, for each respective object:
encoding features of the respective object in the source;
for each of the respective targets, defining respective attention maps between the features encoded from the source and features of the respective object encoded from the respective target;
associating the respective objects to respective locations in the current frame using an Intersection over Union (IoU) function responsive to the respective attention maps to rank candidate object proposals for the respective locations, where each candidate object proposal is tracked from a single-frame reference annotation of a reference frame of the video clip providing ground truth locations of the respective objects in the reference frame; and
defining a video segmentation mask for the respective object in the current frame in accordance with the associating.

2. The method of claim 1, wherein, for each candidate object proposal, the Intersection over Union (IoU) function provides an IoU value that is responsive to each attention map with which to rank the candidate object proposals, the ranking selecting a highest IoU value for the respective object to identify the respective object in the current frame thereby tracking the respective object from the reference frame through the previous frame to the current frame.

3. The method of claim 2, wherein the IoU value is a fusion of respective IoU values for the respective object from each of the respective attention maps.

4. The method of claim 1, wherein defining a video segmentation mask comprises removing pixel-wise overlap from the respective objects in the current frame.

5. The method of claim 1 comprising using the video segmentation mask to apply an effect to the respective object for display.

6. The method of claim 5, wherein the effect is associated with a product and/or service and the method comprises providing an interface to purchase one or both of the product and/or service.

7. A computing device comprising a non-transient storage device and a processor coupled thereto, the storage device storing instructions, which when executed by the processor, configure the computing device to perform semi-supervised video object segmentation to track and segment one or more objects throughout a video clip comprising a sequence of frames including respective previous frames and a current frame, each of the respective previous frames defining a respective target and the current frame a source, the computing device operating to:
- for each respective object:
  - encode features of the respective object in the source; and
  - for each of the respective targets, define respective attention maps between the features encoded from the source and features of the respective object encoded from the respective target;
- associate the respective objects to respective locations in the current frame using an Intersection over Union (IoU) function responsive to the respective attention maps to rank candidate object proposals for the respective locations, where each candidate object proposal is tracked from a single-frame reference annotation of a reference frame of the video clip providing ground truth locations of the respective objects in the reference frame; and
- define a video segmentation mask for the respective object in the current frame in accordance with associating the respective objects to respective locations in the current frame using the Intersection over Union (IoU) function.

8. The computing device of claim 7, wherein, for each candidate object proposal, the Intersection over Union (IoU) function provides an IoU value that is responsive to each attention map with which to rank the candidate object proposals, the ranking selecting a highest IoU value for the respective object to identify the respective object in the current frame thereby tracking the respective object from the reference frame through the previous frame to the current frame.

9. The computing device of claim 8, wherein the IoU value is a fusion of respective IoU values for the respective object from each of the respective attention maps.

10. The computing device of claim 7, wherein to define a video segmentation mask comprises removing pixel-wise overlap from the respective objects in the current frame.

11. The computing device of claim 7 comprising using the video segmentation mask to apply an effect to the respective object for display.

12. The computing device claim of 11, wherein the effect is associated with a product and/or service and the computing device is configured to provide an interface to purchase one or both of the product and/or service.

* * * * *